2 Sheets—Sheet 1.

G. R. LEAN.

ELECTRIC ARC LIGHTING.

No. 11,559 Reissued July 21, 1896.

THE NORRIS PETERS CO., PHOTO-LITHO., WASHINGTON, D. C.

2 Sheets—Sheet 2.

G. R. LEAN.

ELECTRIC ARC LIGHTING.

No. 11,559. Reissued July 21, 1896.

Witnesses
E. J. Nottingham
G. F. Downing

Inventor
G. R. Lean
By H. A. Seymour
Attorney

THE NORRIS PETERS CO., PHOTO-LITHO., WASHINGTON, D. C.

UNITED STATES PATENT OFFICE.

GEORGE R. LEAN, OF CLEVELAND, OHIO, ASSIGNOR TO THE JANDUS ELECTRIC COMPANY, OF SAME PLACE.

ELECTRIC-ARC LIGHTING.

SPECIFICATION forming part of Reissued Letters Patent No. 11,559, dated July 21, 1896.

Original No. 553,921, dated February 4, 1896. Application for reissue filed May 21, 1896. Serial No. 592,510.

*To all whom it may concern:*

Be it known that I, GEORGE R. LEAN, of Cleveland, in the county of Cuyahoga and State of Ohio, have invented certain new and useful Improvements in Electric-Arc Lighting; and I do hereby declare the following to be a full, clear, and exact description of the invention, such as will enable others skilled in the art to which it appertains to make and use the same.

My invention relates to an improvement in electric-arc lighting, and more particularly to means for operating electric-arc lamps in series on multiple-arc circuits of high voltage and constant potential.

It is the object of my invention to provide means whereby two or more lamps, not in themselves adapted to burn in series, can be successfully operated in multiple-arc series on high-voltage constant-potential circuits.

With this object in view the invention consists in the combination, with a multiple-arc circuit, of two or more arc-lamps, each having a separating and feeding magnet included in series therein, a magnet included in a shunt-circuit between the terminals of each lamp, the coil of each shunt-magnet being adapted to compensate for increase in voltage of the arc of the lamp between the terminals of which it is connected, contacts connected with the terminals of the separating and feeding magnet of each lamp, and an armature for the shunt-magnet adapted to engage the said contacts and short-circuit the separating and feeding magnet when the voltage of the arc increases, whereby increase in voltage of the arc of one lamp will not affect other lamps in the said multiple-arc circuit, substantially as set forth.

Figure 1:
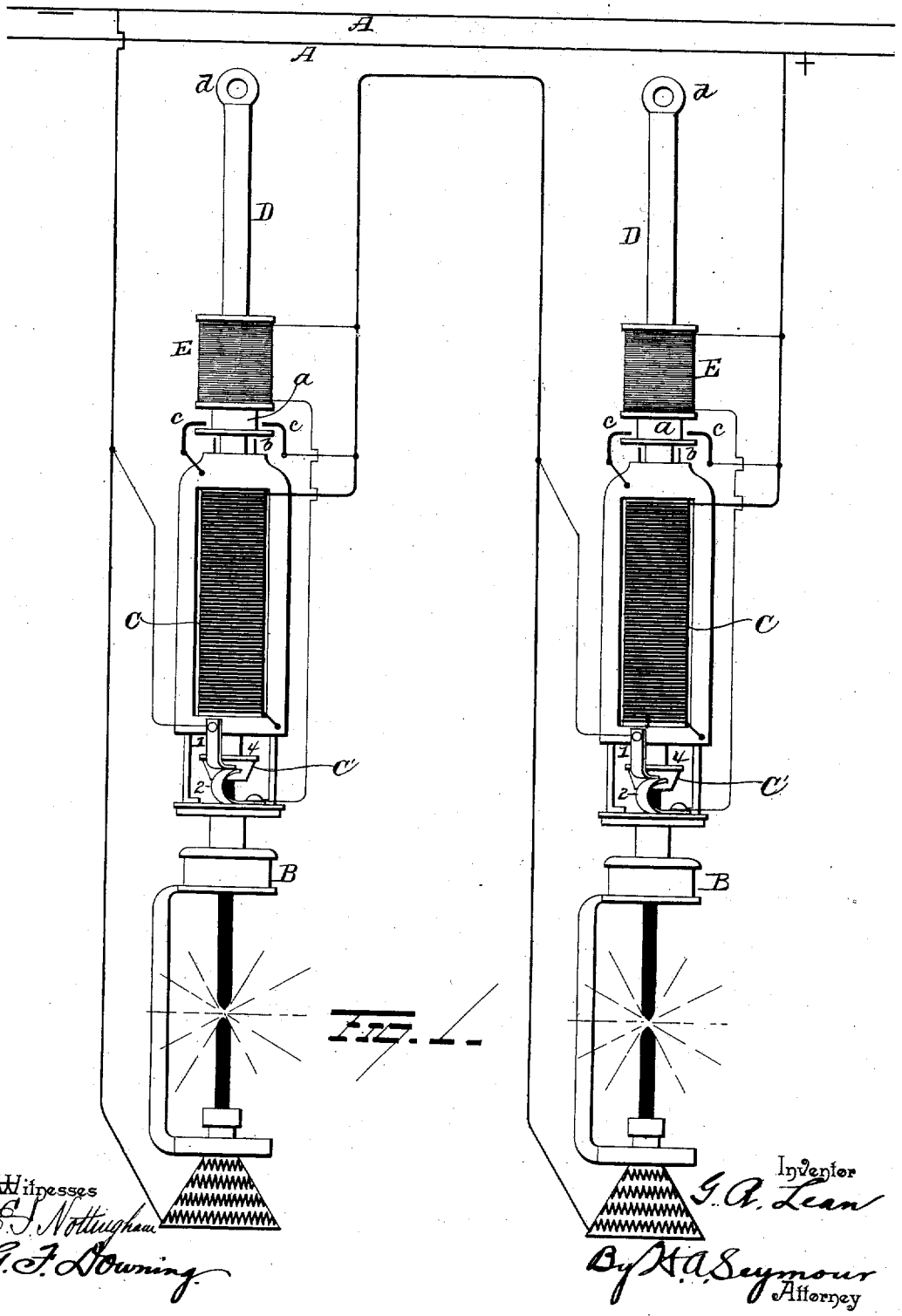
Figure 2:
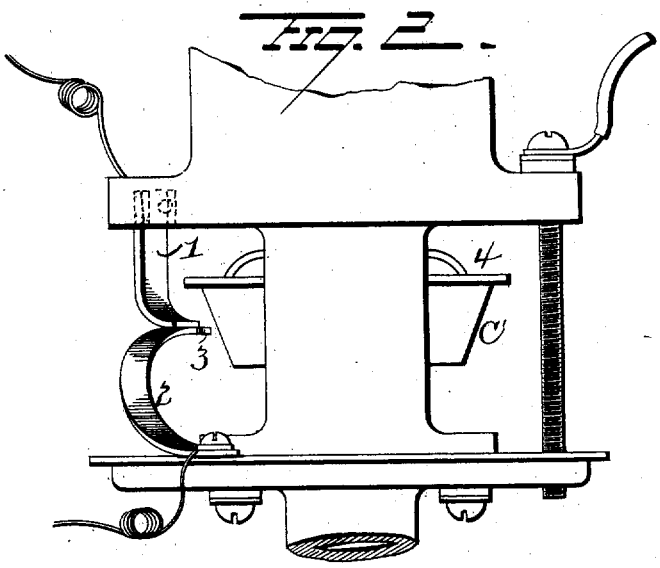
Figure 3:
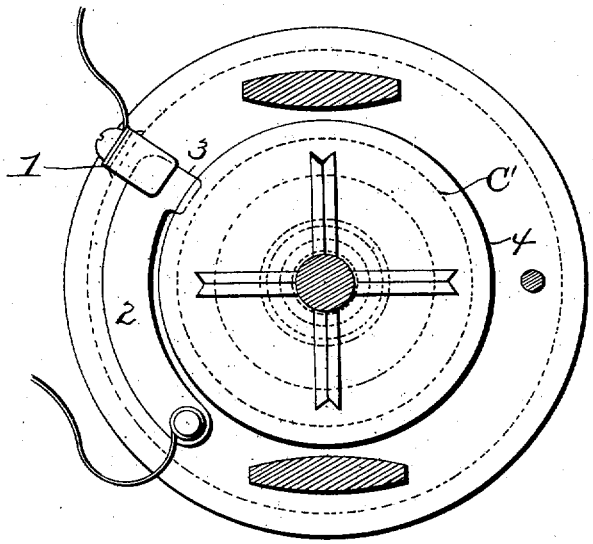

In the accompanying drawings, Figure 1 illustrates an embodiment of my invention. Figs. 2 and 3 are detail views.

My improvements are intended more particularly for use with arc-lamps such as described in patent to William Jandus, No. 543,445, in which a long arc of correspondingly high voltage is employed, and I have illustrated my improvements in connection with such lamp.

A A represent two mains, between which two arc-lamps B B′ are shown connected in multiple-arc series. Each lamp is provided with a separating and feeding magnet C, and the frame of each lamp is provided with a stem or chimney D, which may be provided with an eye *d*. On the stem or chimney D the coil E of an electromagnet or solenoid is placed, and said coil E is included in a shunt-circuit between the terminals of the lamp. The armature *a* of the solenoid E is made with shoulders *b*, adapted, when the coil or solenoid is energized, to engage contacts *c c*, connected with the terminals of the separating and feeding magnet C.

When two or more arc-lamps, such as the Jandus lamp above referred to, are placed in multiple-arc series, (without the provision of the shunt-coil or solenoid and the devices operated thereby,) each lamp will draw its arc through the agency of the magnet C; but if one lamp should draw a longer arc than the other both lamps would be affected equally instead of correcting only the lamp which has drawn the excessive arc.

Each coil or solenoid E is so constructed that when there is any increase of the length of the arc beyond the normal and consequent rise in voltage at the terminals of any one of the series of lamps the excess will flow through the shunt-coil E of that particular lamp and cause the armature *a* to rise and make contact with the contacts *c c*, thus short-circuiting the separating and feeding magnet C and allowing the carbon of that lamp to feed and the arc to right itself without affecting the other lamp or lamps of the series.

The adjustment of the shunt-winding or solenoid E and the short-circuiting contacts can be readily accomplished by changing the relation of the solenoid to that of the armature by raising or lowering the solenoid on the chimney of the lamp, or any other form of adjustment may be used.

It is desirable to provide means whereby to open-circuit the shunt in case the lamps cease to burn on account of accident, such as the breaking of a carbon, and also when the carbons have burned out. For this purpose I employ the switch shown in detail in Figs. 2 and 3. This switch comprises an insulated rigid arm 1, having a curved lower end, and a spring-arm 2, secured to and insulated from the lamp-frame and adapted to normally make electrical contact with the contact-arm 1. The spring-arm 2 is made at its free end with a lip 3, normally disposed in the path of a flange 4, projecting from the armature C′ of the magnet C. The contact-arms 1 2 are included in the shunt-circuit, above described, in series with the resistance-coil E. It will be seen that when the armature C′ falls the flange 4 thereon will engage the lip 3 on the switch-arm 2 and move the free end of said switch-arm 2 downwardly away from the contact-arm 1, thus opening the shunt-circuit.

My improvements are simple in construction and are effectual in the performance of their functions.

Having fully described my invention, what I claim as new, and desire to secure by Letters Patent, is—

1. In an arc-lighting system, the combination with a multiple-arc circuit, of two or more arc-lamps, each having a separating and feeding magnet, included in series therein, a magnet or solenoid included in a shunt-circuit between the terminals of each lamp, the coil of each shunt-magnet or solenoid being adapted to compensate for increase in voltage of the arc of the lamp between the terminals of which it is connected, contacts connected with the terminals of the separating and feeding magnet of each lamp and an armature of said shunt-magnet or solenoid adapted to engage said contacts and short-circuit the separating and feeding magnet when the voltage of the arc increases, whereby increase of voltage of the arc of one lamp will not affect other lamps in the same multiple-arc circuit, substantially as set forth.

2. The combination with an arc-lamp having a separating and feeding magnet and an armature for said magnet having a flange or projection, of a coil included in a shunt between the terminals of the lamp, and a cut-out included in said shunt-circuit, said cut-out comprising a rigid and a spring arm normally in contact with each other, the spring-arm having a lip or projection normally disposed in the path of the flange or projection on the said armature, substantially as set forth.

In testimony whereof I have signed this specification in the presence of two subscribing witnesses.

GEORGE R. LEAN.

Witnesses:
D. W. ROCKWELL,
J. M. SEE.